(12) United States Patent
Pettey et al.

(10) Patent No.: US 11,724,442 B2
(45) Date of Patent: Aug. 15, 2023

(54) PROCESS OF MANUFACTURING RETICULATED FOAM PRODUCTS, USING ALTERNATIVE MATERIALS

(71) Applicant: RESPONSE TECHNOLOGIES, LLC, West Warwick, RI (US)

(72) Inventors: David A. Pettey, Westport, MA (US); Edmund Francis Bard, Cumberland, RI (US)

(73) Assignee: RESPONSE TECHNOLOGIES, LLC, West Warwick, RI (US)

( * ) Notice: Subject to any disclaimer, the term of this patent is extended or adjusted under 35 U.S.C. 154(b) by 784 days.

(21) Appl. No.: 16/510,465

(22) Filed: Jul. 12, 2019

(65) Prior Publication Data

US 2020/0016441 A1    Jan. 16, 2020

Related U.S. Application Data

(60) Provisional application No. 62/697,180, filed on Jul. 12, 2018.

(51) Int. Cl.
*B29C 64/118* (2017.01)
*A62C 99/00* (2010.01)
(Continued)

(52) U.S. Cl.
CPC ........ *B29C 64/118* (2017.08); *A62C 99/0036* (2013.01); *B29C 45/00* (2013.01); *B29C 45/0001* (2013.01); *B29C 64/10* (2017.08); *B29C 64/106* (2017.08); *B33Y 10/00* (2014.12); *B60K 2015/03381* (2013.01)

(58) Field of Classification Search
CPC ....... B32B 3/266; A62C 5/02; A62C 99/0036; A62C 3/06; A62C 3/07; A62C 3/08; A62C 3/065; B33Y 80/00; B33Y 10/00; Y10T 428/249953; Y10T 428/249962; Y10T 428/24996; B29C 64/106–135; B29C 45/00; B29C 45/0001; B60K 15/03006; B60K 2015/03381; B60K 2015/03394; B60K 2015/0344; B64D 37/32; F23K 5/16
See application file for complete search history.

(56) References Cited

U.S. PATENT DOCUMENTS 10,684,080 B2 * 6/2020 Moore ................ F28D 7/08
11,091,266 B2 * 8/2021 Ching ................ B64C 3/34
(Continued)

FOREIGN PATENT DOCUMENTS

CN        108099589        *  6/2018   ............. B60K 15/03

*Primary Examiner* — Manley L Cummins, IV
(74) *Attorney, Agent, or Firm* — Lando & Anastasi, LLP

(57) ABSTRACT

An explosion suppression insert for a fuel tank includes a hollow body having an inner surface and an outer surface, the hollow body being made of an explosion suppressing material; and a plurality of perforations defined in the outer wall. In some embodiments, a nonwoven explosion resisting insert for a fuel tank includes a body including a plurality of interconnected non-woven fibrous struts being made of an explosion suppressing material, the body having a first end and a second end; and a plurality of voids defined by the plurality of struts, the voids being configured such that the body has a porosity of between 5 pores per inch and 50 pores per inch. Methods of manufacturing explosion resisting inserts are also provided.

4 Claims, 6 Drawing Sheets

(51) Int. Cl.
*B29C 64/10* (2017.01)
*B29C 64/106* (2017.01)
*B29C 45/00* (2006.01)
*B60K 15/03* (2006.01)
*B33Y 10/00* (2015.01)

(56) References Cited

U.S. PATENT DOCUMENTS

| | | | | |
|---|---|---|---|---|
| 2010/0284150 | A1* | 11/2010 | Manahan | A62C 4/00 |
| | | | | 361/695 |
| 2012/0273239 | A1* | 11/2012 | Brennan | A62C 4/00 |
| | | | | 169/45 |
| 2016/0000052 | A1* | 1/2016 | Lin | C02F 3/109 |
| | | | | 210/345 |
| 2016/0238193 | A1* | 8/2016 | Meyer | F17C 1/00 |
| 2017/0057133 | A1* | 3/2017 | Hanson, III | B29C 45/77 |

* cited by examiner

PROCESS OF MANUFACTURING RETICULATED FOAM PRODUCTS, USING ALTERNATIVE MATERIALS

RELATED APPLICATIONS

This application claims priority under 35 U.S.C. § 119(e) to U.S. Provisional Application Ser. No. 62/697,180 titled "Process of Manufacturing Reticulated Foam Products, Using Alternative Materials" filed on Jul. 12, 2018, which is herein incorporated by reference in its entirety.

BACKGROUND OF THE INVENTION

The present disclosure relates to inerting foam products and applications, and, more particularly, to a process of forming alternative materials for use in inerting foam applications.

A large application of industrial and military reticulated foams, also known as inerting foams, is for use in explosion-resistant fuel bladders. In this example, the current materials used for these foams may only last a few months. Recent trends in the use of ethanol and other biobased fuels have worsened this problem. In other industrial applications, such as water filters, gas filters, and air filters, these foams offer suboptimal filtration performance. This performance gap is a result of the reticulation process itself being highly variable.

More specifically, the cell sizes and cell shapes of these foams is highly variable, which translates to correspondingly variable flow rates of media through the filter itself. Finally, reticulated foams are made via subtractive manufacturing processes, which translates to long lead times and high costs.

These foam systems do not work well because they can only be made with polyester-based and polyether-based urethane chemistries. With the increased prevalence of biobased and synthetic fuels, even the polyester-based urethane foams have limited lifecycles of one to three years, when used within high-heat, fuel, and harsh chemical environments. When used in newer fuel systems, for example systems that use fuels having greater than 20% ethanol content, the lifecycle can be reduced to as little as six months. Another disadvantage of prior art foam system is that their manufacturing processes are very random and variable. This translates to high working losses, because of high process scrap levels, as well as because products are not robustly able to meet performance requirements in high risk applications. Products not meeting performance requirements must also be scrapped. There is also scrap that is inherent in the process. For example, the bun stock must have all sides skived, to remove the skinned outer layers. Further, the bun stock must be converted (cut) into the final shapes of the fuel tanks they are to be inserted in. For a 40-inch bun that is being converted for a 36-inch-wide tank, then there would be 10% waste. Another disadvantage is that converted foams are not able to fit precisely within their containment housings. This results in voids between the tank housing and foam filter, which can cause the disruption of the fuel flow to a sump pump, or other pick-up points within the tank. Conversely, where the foam is larger than the housing, the pressure of the foam against the housing wall causes the outer edge of the foam to be denser. The denser foam would have correspondingly lower flow rates.

The current reticulated foams range in density. Specifically, the U.S. military (MIL-PRF-87026B) has performance specifications covering inerting foam performance of a tight range of densities, of 1.3 to 1.8 pounds per cubic foot. The military is currently seeking to drive this density to below 1.0 pounds per cubic foot, with the aim of reducing weight, minimizing fuel displacement and retention, while at the same time extending longevity, and preserving the safety performance of explosion resistance. Driving the densities lower with the incumbent urethane technology is likely to only increase their failure rates. Additionally, fuel retention and displacement levels of the incumbent reticulated foam systems is in the order of 5%. This 5%, in combination with the aforementioned density levels, decreases the capacity of fuel tanks to nearly 7%. In applications where weight and mission lengths are critical, 7% is a very significant impact.

The current art is limited in the scope of materials that reticulated foams are manufactured. The current art can only produce inerting foams that have widely varied pore or cell sizes. The current art is highly process intensive and costly. The current art is limited to producing bun stock, which requires subsequent converting processes to get the foam into the final desired shapes. The supply chain is also fragmented, where entities producing the foam buns are not the same as those entities which convert the bun stock into the final foam form. This complication impacts the lead time and the cost of these conventionally produced reticulated foams.

The current art is difficult to maintain. With use, these foam systems inevitably need to be removed and replaced with a new foam system within the explosion resistant fuel tanks. Removing foam components that easily tear and that retain high levels of absorbed fuel is a complicated and tedious task at best. Small, broken or degraded pieces of foam can also get trapped within the fuel lines, eventually causing choking and engine system failure.

An inerting system that can be easily installed (and removed) when needed is also of value in military applications and professional racing team applications. Ultimately, a system that does not degrade, is low cost, and light in weight, could pave the path for explosion resistance protection within the mass passenger automotive market.

Low cost safety foams systems can be made to outsurvive the metallic or HDPE tanks within which they are contained. This performance shift could enable the market barrier to be broken, and their inclusion of explosion resistant fuel tanks into the passenger automotive market.

These commercial limitations have triggered the need for improved alternatives for reticulated foams, and complementary inerting material systems applications.

SUMMARY

In one aspect of the present disclosure an explosion suppression insert for a fuel tank, the insert comprises a hollow body having an inner surface and an outer surface, the hollow body being made of an explosion suppressing material; and a plurality of perforations defined in the outer wall.

In some embodiments, the outer surface of the hollow body is spherical.

In some embodiments, the hollow body includes a plurality of struts, the perforations being defined between adjacent struts.

In some embodiments, the hollow body is 3D printed or formed by injection molding.

In some embodiments, the hollow body is formed of a thermoplastic material.

According to another aspect of the present disclosure, a nonwoven explosion suppression insert for a fuel tank, the insert comprises a body including a plurality of interconnected non-woven fibrous struts being made of an explosion suppressing material, the body having a first end and a second end; a plurality of voids defined by the plurality of struts, the voids being configured such that the body has a porosity of between 5 pores per inch and 50 pores per inch.

In some embodiments, the struts are made of a thermoplastic.

In some embodiments, the thermoplastic includes fibers between 1 denier and 500 denier.

In some embodiments, the thermoplastic includes fibers between 5 denier and 1000 denier.

In some embodiments, the struts are made of fibers having a length between 0.1 inch and 6 inches.

According to another aspect of the present disclosure, a method of forming an explosion resisting insert for a fuel tank, the method comprises forming an explosion suppressing material into a hollow body of the insert, the hollow body having an inner surface and an outer surface; and forming a plurality of perforations in the outer wall.

In some embodiments, forming the hollow body includes forming the hollow body by additive manufacturing.

In some embodiments, the method further includes inputting a 3D model of the insert to a controller; outputting instructions from the controller to one of a 3D printer and an injection molding machine; and one of 3D printing and injection molding the insert.

In some embodiments, the method comprises injection molding the insert from a thermoplastic material.

In some embodiments, forming the hollow body comprises forming a spherical hollow body.

According to another aspect of the present disclosure, a method of forming an explosion suppression insert for a fuel tank, the method comprises extruding a feedstock material into a cooling bath to form a body including a plurality of interconnected non-woven fibrous struts being made of an explosion suppressing material, the body having a first end and a second end, and a plurality of voids defined by the plurality of struts, the voids being configured such that the body has a porosity of between 5 pores per inch and 50 pores per inch.

In some embodiments, the feedstock material is a thermoplastic.

In some embodiments, the step of extruding includes extruding fibers between 1 denier and 500 denier.

In some embodiments, the step of extruding includes extruding fibers between 5 denier and 1000 denier.

In some embodiments, the step of extruding includes extruding fibers having a length between 0.1 inch and 6 inches.

BRIEF DESCRIPTION OF THE DRAWINGS

The accompanying drawings are not intended to be drawn to scale. In the drawings, each identical or nearly identical component that is illustrated in various figures is represented by a like numeral. For purposes of clarity, not every component may be labeled in every drawing. In the drawings.

DETAILED DESCRIPTION OF THE INVENTION

Figure 1:
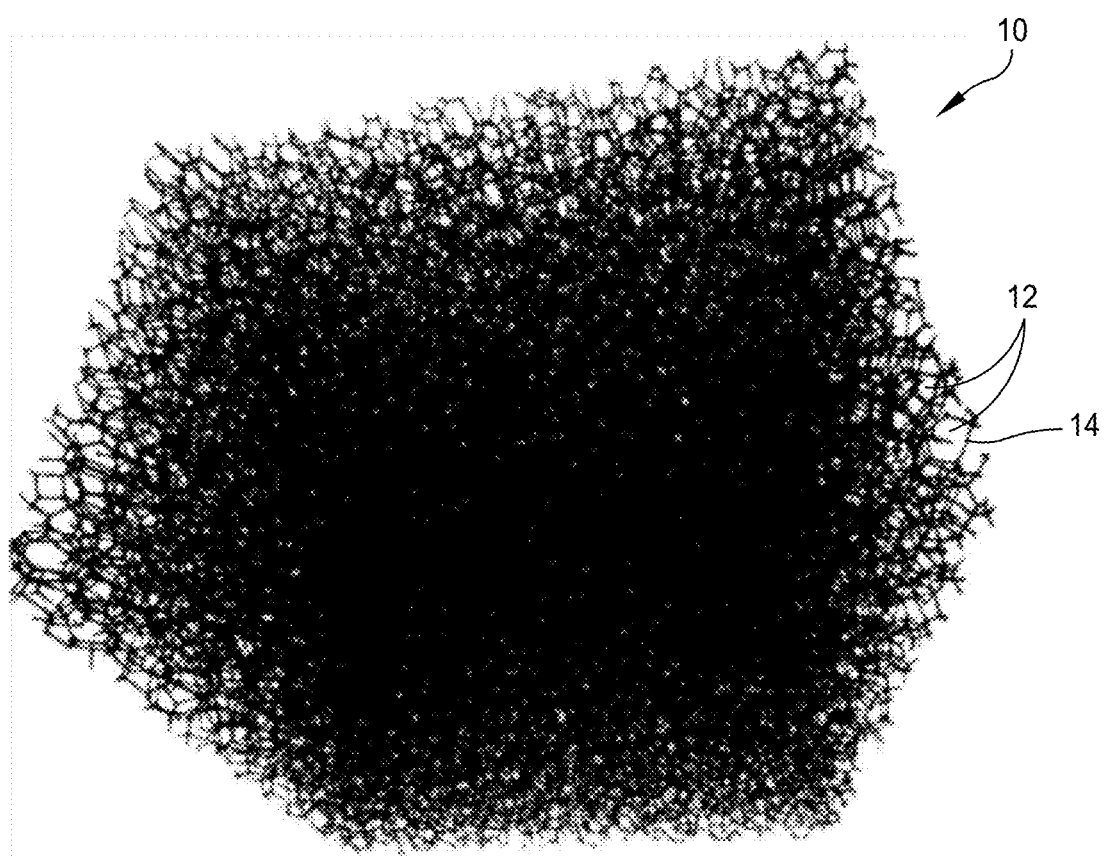
FIG. 1 is a perspective view of a finished, reticulated, 3D printable foam product.

The following detailed description is of the best currently contemplated modes of carrying out exemplary embodiments of the disclosure. The description is not to be taken in a limiting sense but is made merely for the purpose of illustrating the general principles of the present disclosure.

The present disclosure provides inserts that can be used as filters for print cartridges; explosion resistant foams for fuel cells and fuel tanks; in-line filters for Food & Drug Administration (FDA), pharmaceutical, and other high-end sensitive processing lines; insulation, acoustical, and heat protection foams and battings; in-line filters; precursor forms for ceramic foams and filter; or porous foams for medical applications.

Inserts of the present disclosure can be used in a variety of fuel tanks. In some embodiments, inserts of the present disclosure can be used in a fuel tank for a vehicle, such as a fuel tank for a helicopter or a fuel tank for an automobile. In some embodiments, a plurality of inserts of the present disclosure are used in a single fuel tank.

In some embodiments, the present disclosure provides a fuel tank including one or more inserts of the present disclosure. In some embodiments, the fuel tank is a fuel tank for a vehicle, such as a fuel tank for a helicopter or a fuel tank for an automobile. In some embodiments, a plurality of inserts of the present disclosure are used in a single fuel tank.

The present disclosure also provides methods for making inserts of the present disclosure. For example, the present disclosure provides a method for additively manufacturing reticulated, and other high-performance engineered foams. According to one or more methods of the present disclosure, a person may produce an engineered foam that addresses a variety of unique technical performance needs. For example, methods can be used to produce inserts having desired porosity, flow rates, explosion resistance, chemical and heat resistance, and/or a unique shape of the insert.

The present disclosure solves several problems associated with reticulated foams. The present disclosure provides a rapid approach for developing and additively manufacturing unique reticulated foam shapes, cell sizes, and chemical composition of the foam itself. The present disclosure affords the industrial markets with a means for rapid prototyping and manufacturing of uniquely engineered high performance foams. The present disclosure solves the high costs, and high minimum order size thresholds associated with the current art reticulated foams. The present disclosure can solve these problems by first, programmatically, via appropriate computer-aided design (CAD) software programs, designing the ideal foam structure (cell size and cell shape) for the target applications; second, using feedstocks of engineered materials that address the unique demands of the target applications; third, rapidly 3D printing the engineered foam products; and fourth, adding unique physical, chemical, and heat performance characteristics to unique areas of the foam within the target application.

The relatively broad availability of 3D printer feedstock enables engineered foams to be built with materials that are uniquely engineered to withstand their target environments. The present disclosure also takes advantage of the unique ability of 3D printers to additively and incrementally construct (build) objects at very high levels of precision of 0.001 inch to 0.005 inch. In this example, a foam product built on a 3D printer is highly uniform, from particle-to-particle or cell-to-cell within parts, as well as from part-to-part. The ability to design and ultimately control the size and location of the cells within an engineered foam mitigates, if not eliminates, the high rejection rates of the current art. The ability to control cell wall thickness and cell (void) sizes enables an engineered foam to be produced that have specified: density, retention, displacement, and explosion resistance properties. These four properties can be individually engineered to make the ideal foam for unique end use applications.

Of equal value is that 3D printers allow the formation of precisely defined external dimensions. Essentially, engineered foam produced on a 3D printer can be made to precisely fit within their target housing. Where precision fitting of foam is required, tolerances of 0.001 inch to 0.005 inch can be achieved. This is the equivalent of a molded reticulated foam, without the outside skin associated with the molded foam.

Methods of the present disclosure enable the ability to engineer the precise cell size and shape of a foam product would enable the optimization of the flow rates of media, such as fluids, through foams.

Referring now to FIG. 1, a foam product generally indicated at 10 produced according to the present disclosure is shown. FIG. 1 illustrates a finished, reticulated, 3D printable foam product 10. The foam product 10 includes cells 12 that have cell walls 14. The size of each cell 12 of the foam structure 10 can be changed to adjust the density and porosity of the foam product 10. Current art foams have a range of 10 cells to about 29 cells per linear inch. The cell wall 14 can be varied to adjust the tensile and tear strength of the foam, as well as its resiliency.

According to military specification MIL-DTL 83054C, a coarser foam product, or a foam product with fewer cells (but larger cells) would have a lower pressure drop when a fixed volume of air is passed through it. Conversely, a foam with more but smaller cells would have a higher pressure drop. The inserted grid is from the standard. As a practical matter, foams that have fewer than 5 pores (cells) per inch would have less explosion suppression and slosh resistance properties. Foam with greater than 60 pores (cells) per inch would have high explosion suppression and slosh resistance properties. However, these gains would be at the expense of higher fuel retention and fuel displacement.

According to a method of the present disclosure, the foam product 10 of FIG. 1, can be formed using a 3D printer.

In some embodiments, the method of forming the foam product may include various steps. For example, the method for forming the foam block of FIG. 1 may include designing the foam block, inputting the design into a 3D printer, and printing the foam block.

In some embodiments, a first step of the method includes using appropriate computer-aided drafting (CAD) software to design the 3D model of the engineered foam structure. For example, for a part of foam (such as a block of foam), a user can use the CAD software to define the external dimensions of the block, the porosity of the foam, the cell shapes and structures, as well as the cell wall thickness.

In the step of designing the 3D model, the 3D model of the engineered foam products may have a precisely drawn CAD design for the end-product to work. Failure in the step of designing the 3D model translates to unnecessary and costly trial and error on the printer itself. Most 3D printers have become highly adaptable to a wide range of file formats that result from unique CAD software programs.

CAD software packages that have simulation modeling capabilities may improve the designs created in the first step. Many of the engineered foam applications will be used in processing and products where flow and filtration are critical success criteria. Various CAD software packages can be used for modeling fluid dynamics, thermal dynamics, structural dynamics, and other properties.

In some embodiments, a second step of the method includes loading the final CAD design onto an appropriate 3D printer and loading a material or feedstock into the printer feed section. In some embodiments, the material is the ideal material for the end-use of the part to be printed.

In parallel with the step of loading the CAD design onto a printer, the method may include screening appropriate levels of feedstock materials to ensure the 3D printed foam design will meet the form, fit, and functional requirements of the end-product. For example, feedstocks need to be selected such that the final foam product meet certain compression, tensile, fuel, heat, and chemical, properties, depending on the performance needs of the end-use product. Further, through testing, the user needs to determine whether the feedstock undergoes any deleterious physical or chemical property changes because of being processed through the 3D printer.

The first and second steps above may benefit from a skilled technician developing a process profile for the selected feedstock and complexity and nuances of the design. The participation of the skilled technician in the first and second steps of the method can help minimize process development time. Precisely designing the object for manufacturability will hasten the commercialization process.

Simulating flow and filtration in advance of physically testing the final product (or prototypes) also hastens the time to market of new products. This is particularly the case, where the reticulated foam is being used as a precursor to forming ceramic filters. In some embodiments, the CAD design is an inerting part design that optimizes flow and filtration by the inerting part.

With enough experience, a self-learning database can be installed. This database could be fed the selection criteria, such as fuel type, foam density, operating temperature, longevity, and other performance requirements. In some embodiments, the self-learning database may be configured to recommend the best alternates for foam shape design, foam or feedstock material, cell size, cell wall thickness, and/or other properties, and makes the necessary process profile adjustments to a 3D printer.

In some embodiments, a third step of the method includes producing engineered foam to the desired shape and build specification based on the final CAD design. Additional steps may include performing quality control of the part that is printed, releasing the part for shipment, and/or other steps.

Figure 2:
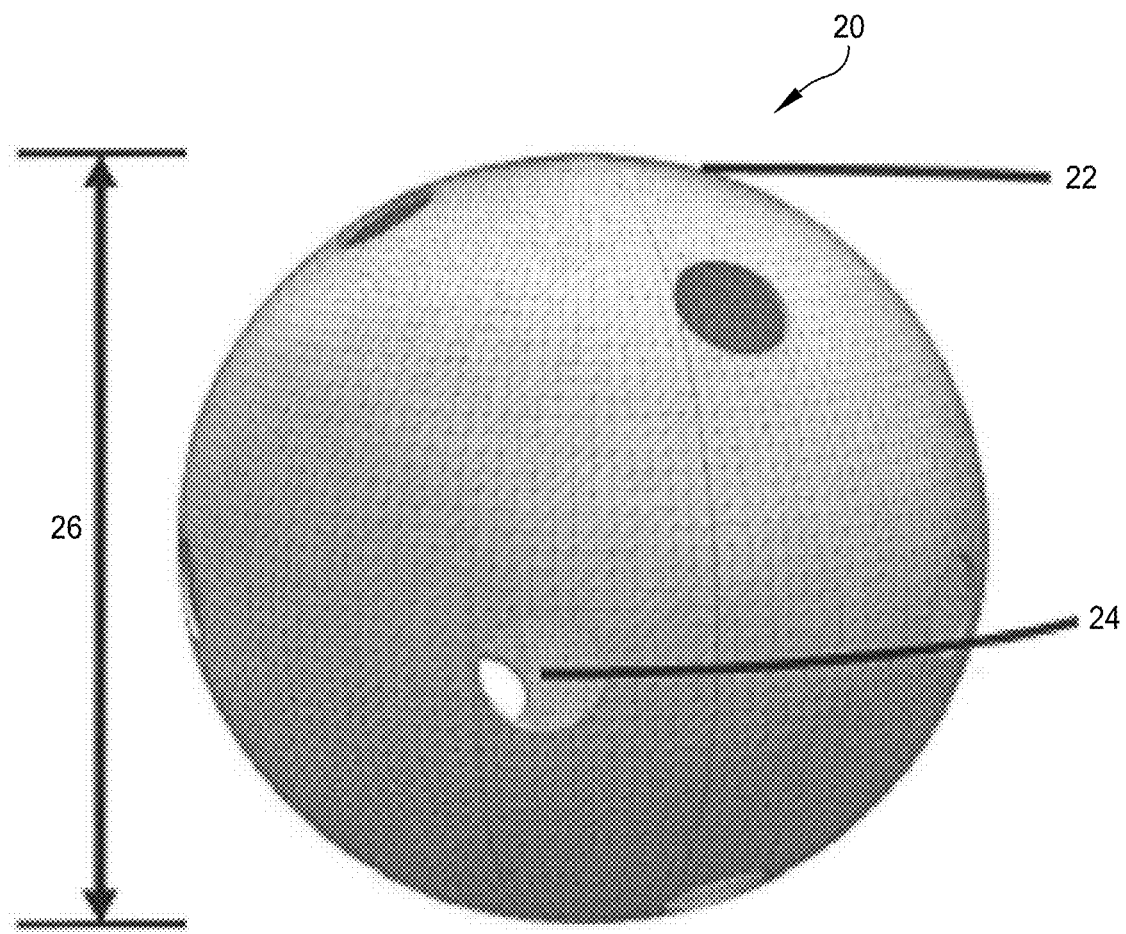
FIG. 2 is a perspective view of a fuel resistant perforated hollow sphere.

Referring now to FIG. 2, a fuel resistant perforated inerting structure includes a hollow sphere generally indicated at 20, that can be either 3D printed, or injection molded. The hollow sphere 20 includes a spherical cell wall 22 having a thickness that can be adjusted to meet strength needs, and particularly, resiliency. The thickness of the cell wall can also impact the overall density of the sphere 20.

A plurality of perforations 24 are defined as through-holes in the cell wall 22. The size of the perforations 24 can be adjusted to impact the overall density of the hollow sphere 20.

The sphere 20 has an overall diameter 26 that can be adjusted to optimize the explosion resistance of a fuel cell system that includes a plurality of the spheres 20. The smaller the diameter 26, the closer the foam including the spheres 20 approximates the prior art inerting foams. The larger the diameter 26, the easier the installation and removal of the foam. In some embodiments, the outside diameter 26 of each sphere is between 0.2 inch to 2.0 inches. The pore (cell) size of spheres greater than 2 inches would be too high to be able to suppress explosions. In this example, the larger diameter spheres would translate to a coarser (lower pores per inch) foam. Conversely, spheres that are less than 0.2 inch, would translate to a foam of higher pores per inch. This would translate to objectionably high fuel displacement and retention levels. The diameter 26 of the sphere 20, the wall thickness, and the number of perforations 24 in the sphere 20 can be adjusted to meet the corresponding application need. Lower density foam applications would use thinner wall products, larger diameters, and more perforations 24. Conversely, smaller diameter spheres will compact more in their fuel environments, so higher densities could be achieved. Fewer perforations 24 and thicker walls 22 also directionally increase the net density of the inerting solution that includes a plurality of spheres 20.

Embodiments of the present disclosure may form an inerting foam, such as the sphere 20 of FIG. 2 via, for example, a 3D printing process or an injection molding process.

The shapes of inerting foam inserts according to the present disclosure do not need to be limited to balls, or spheres. For example, FIG. 3 shows an alternative polyhedron structure that which is well suited for this application.

Figure 3:
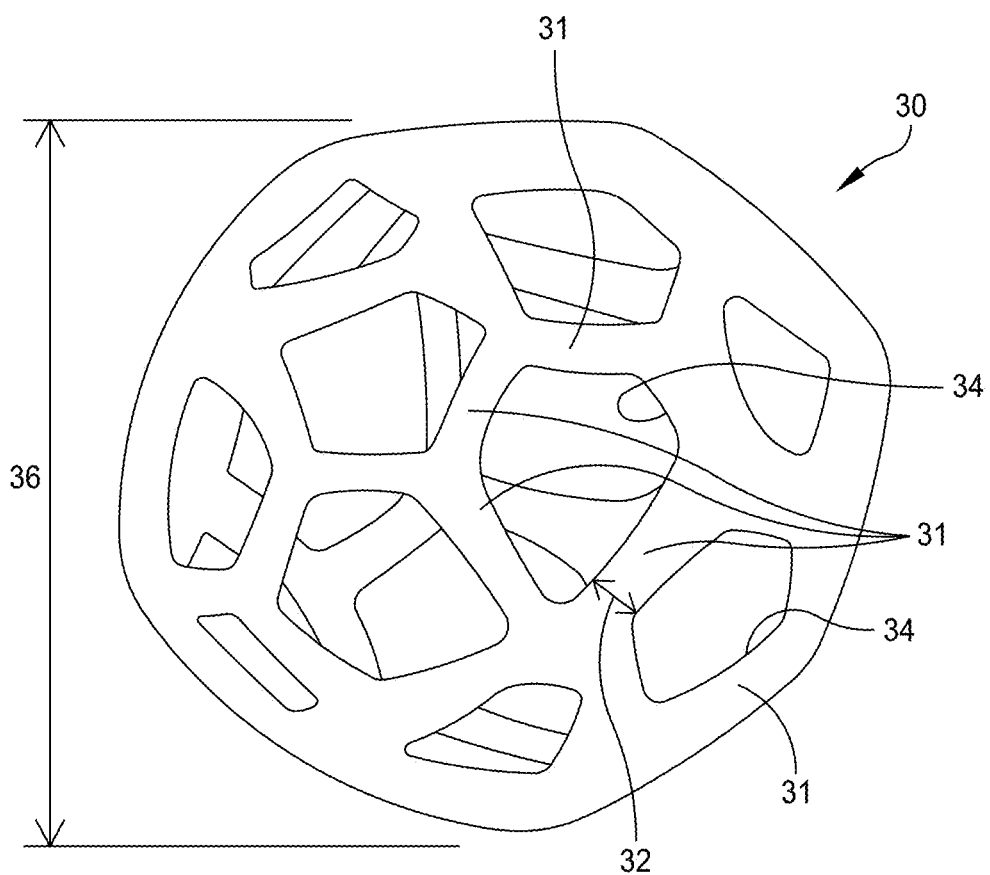
FIG. 3 is a perspective view of an injection molded, or 3D printed polyhedron.

FIG. 3 illustrates an injection molded, or 3D printed polyhedron 30 formed from a plurality of interconnected struts, each indicated at 31. Each strut 31 has a strut thickness 32, which can be increased or decreased to meet strength needs, primarily resiliency. Strut thickness can also impact the overall density of the shape of the polyhedron 30. Together the struts 31 form a hollow body of the polyhedron 30. Perforations or polyhedron voids, each indicated at 34, are defined between the struts 31, so that fluid can enter the hollow body of the polyhedron 30. Each polyhedron void 34 size can be increased or decreased to impact the overall density of the inerting shaped objects. The polyhedron 30 has an overall maximum outer dimension 36 that can be increased or decreased to optimize the explosion resistance of a fuel cell system that includes a plurality of polyhedrons 30. Like the sphere of FIG. 2, the smaller the maximum outer dimension 36, the closer the 3D printed polyhedrons approximate the prior art inerting foams. The larger the maximum outer dimension 36, the easier it is to install the polyhedron 30 in a fuel cell system or remove the polyhedron 30 from a fuel cell system. In some embodiments, the maximum outer dimension of the polyhedron is between 0.2 inch to 2.0 inches. The outer diameter restrictions for the polyhedron are essentially the same as those for the diameter restrictions for the sphere. Too large of a polyhedron would translate to a foam that is too coarse, and therefore would have poor explosion suppression and slosh resistance properties. Conversely, polyhedrons that are too small, would translate to an inerting foam that is too fine (high pores per inch). As per the previous examples, inerting foams that are too fine would have objectionably high fuel retention and displacement properties.

The value of 3D printing is that 3D printing affords the designer the ability to make faster changes in the parameters (material type, wall thickness, shapes, etc.). Once the ideal material type (for example, polyvinylidene fluoride, polycarbonate, polyamide, and others), and form has been determined, the ultimate inerting product can be made more cost effectively on conventional injection molding equipment, and ancillary welding equipment where needed. Further, there are some 3D print matrixes that cannot be injection molded, such as the structure of FIG. 3. The structure of FIG. 3 provides the value of 3D printing (as in the structure of FIG. 1), with the installation and maintenance ease of the structure of FIG. 2.

A significant commercial benefit to the inerting structures shown in FIGS. 2 and 3 is the ability of the user to rapidly install and remove an inerting system that includes a plurality of the inerting structures. Inerting spheres 20 and inerting polyhedrons 30 can be easily poured into a fuel tank for their installation. If needed for maintenance or other purposes, the inerting spheres or polyhedrons can be subsequently vacuumed from the tank. In some embodiments, the inerting spheres or polyhedrons are made of a polymer or material that exhibits fuel and chemical resistance.

The inerting structures of FIGS. 2 and 3 can be made of polymer types with superior fuel resistance properties, can conceivably last the lifetime of the tank, potentially eliminating the need for their replacement over the lifetime of the fuel tank. Another property that can be incorporated into the polymer, or polymer matrix is electrostatic conductivity, or the ability to suppress the generation of sparks which would serve as the ignition source of fuel tank explosions. Electrical resistivity (ohm-cm) levels between $1.0 \times 10^7$ to $5.0 \times 10^{11}$ have proven to be effective for the final polymer matrix composition. Per the United States Air Force's (USAF's) MIL-PRF-87260B specification, this level of electrostatic decay (ESD) is sufficiently high to mitigate the ignition of explosions that would be triggered by static. Further, these products are subjected to explosion resistance testing, so polymers with high heat capacities (Cp) may provide optimal performance, in some embodiments. The incumbent polyurethane polymer has a Cp of 0.43 Calories/gram ° C. Nylon 6,6 is a good substitute for matching heat capacity, having a Cp of 0.41 Calories/gram ° C. Water has a very high Cp of 1.0 Calories/gram ° C., which is why it is excellent at quenching fires. Finally, the physical structure itself, in combination with the conductivity of the materials can be subjected to tests for evaluating explosion suppression levels.

Figure 4:
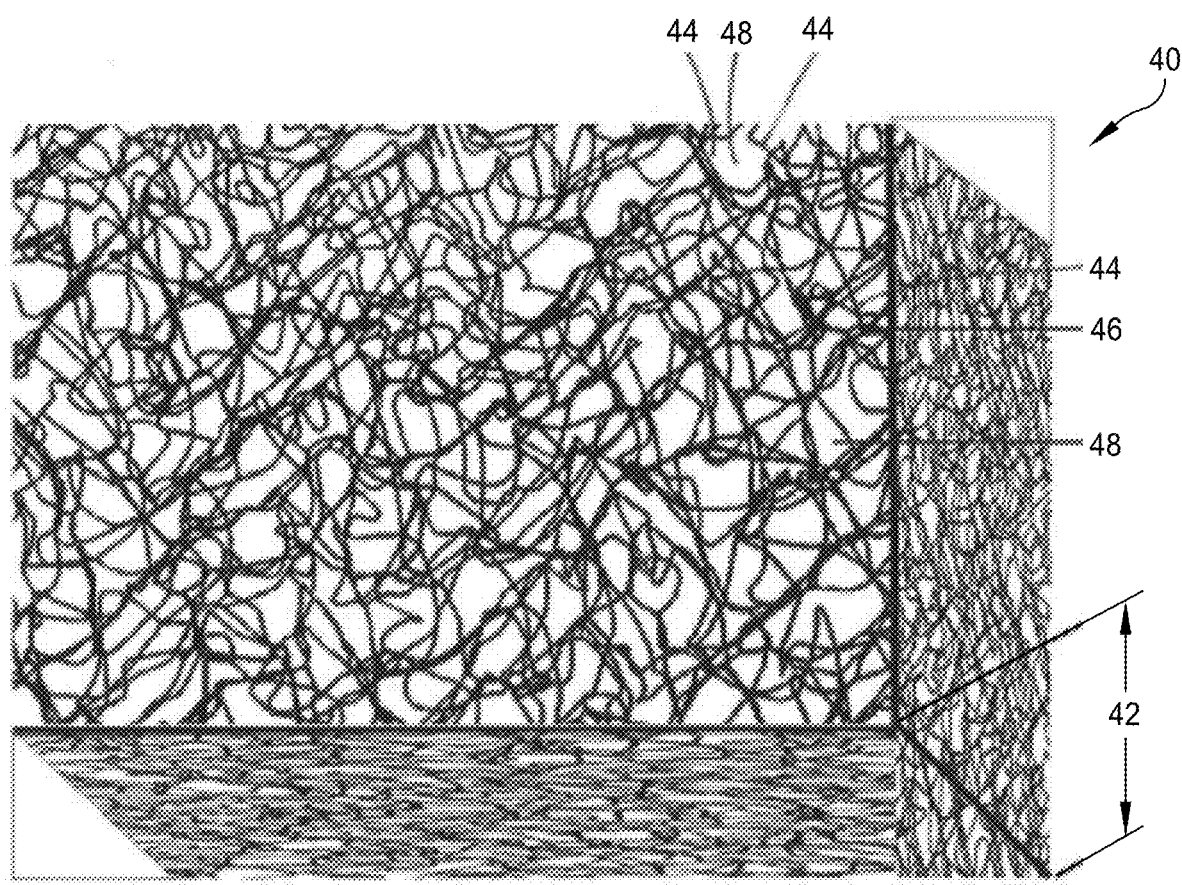
FIG. 4 is a perspective view of a high denier high loft air-laid or carded nonwoven foam block.

Referring to FIG. 4, an alternative inerting foam system can be replicated using a high-loft nonwoven manufacturing technique.

As shown, a high denier high loft air-laid or carded nonwoven foam block generally indicated at 40 has an overall thickness of 42. The foam includes struts each indicated at 44 that have a thickness 46. Voids each indicated at 48 are defined between the struts 44. The strut thickness 46 can be adjusted to meet strength needs, primarily resiliency. Strut thickness 46 can also impact the overall density of the engineered foam block 40. The size of the high-loft nonwoven voids 48 can be adjusted to impact the overall density of the inerting foam blocks, or inerting objects having other shapes.

The nonwoven structure of FIG. 4 results in voids that are not regular, as in the case of the hollow spheres of FIG. 2. The porosity of the nonwoven structure of FIG. 4 may be approximated based on a pressure drop test, such as a test of a pressure drop between a first end of the nonwoven structure and a second end of the nonwoven structure. In some embodiments, the porosity of the foam block 40 of FIG. 4 may be between 5 pores per inch and 50 pores per linear inch. A porosity of fewer than 5 pores per inch is unlikely to suppress ignition, or prevent sloshing, but would be lower in density. Fuel displacement and retention would be low.

Porosity greater than 50 pores per inch would prevent ignitions and sloshing but would be higher in density. Fuel retention and displacement would be objectionably high. In some embodiments, the porosity of the foam block 40 may be between 30 and 50 pores per inch.

Using traditional dry forming fiber blending systems, multiple fiber types can be incorporated into the final inerting foam structure. For example, in some embodiments, heavy denier (such as 50 denier to 500 denier) fibers can be used for structure and resilience. In some embodiments, finer deniers (1 denier to 50 denier) can be used to form smaller cell sizes and to increase slosh resistance. In some embodiments, functional fibers, such as anti-static fibers, anti-fouling fibers, colored fibers, fibers having low-melting temperatures (e.g. for bonding a web of fiber together), other fibers, or combinations thereof can be used.

The high loft nonwoven overall thickness 42 can be adjusted to optimize the explosion resistance of a fuel cell system that incorporates the foam block 40. The thinner the thickness 42, the more preparation and time necessary to install and remove the foam block 40 from the fuel cell. The greater the thickness 42, the easier their installation and subsequent removal of the foam block 40 from the tank. There is no technical limit on the thickness range of high loft nonwoven foams. The ultimate thickness of an air laid or carded nonwoven foam can be adjusted via cross-lapping, or other suitable layer-stacking process. As a practical matter, when the engineered foam is made too thick, the foam system becomes more cumbersome to ultimately install within the fuel cell.

In the foam block 40 of FIG. 4, the fiber length and fiber thicknesses (denier) may be selected to achieve the ideal nonwoven foam density, cell size, loft, and resiliency. Fiber lengths can range between 0.10 inch to 6.0 inches, while fiber deniers can range from 1.0 to 500. Generally speaking, the higher the denier, the stiffer the final foam product will be. Conversely, the lower the fiber denier the higher the number of cells in the final foam structure. Finer denier fibers will also result in softer structures, with smaller cell sizes. The denier and fiber length can be greatly varied, to where there can be as few as 25,000 to as many as 1.0 billion fibers per cubic foot. The calculated range of 25,000 to 1.0 billion fibers per cubic foot assumes a foam density of 1.0 pound per cubic foot. The polymer type of the fiber must also be considered. The fundamental requirements that the fibers be fuel resistant must be met. Polyamide, fiberglass, polyester, basalt, PBO (poly-phenylene-2,6-benzobisoxazole), and other commercially available are good alternatives. The bonding process (for adhering the fibers together) will also influence the fiber selection. Fibers that will be thermally bonded may be thermoplastic.

Likewise, fibers that might be mechanically entangled via a needling process may require more crimp amplitude and frequency. The thickness of the final matt will be dependent on how well fibers can be orientated in the Z-direction of the web. Air-laid and spunbonded manufacturing techniques are processing alternatives for this technical approach.

The nonwoven approach provides a more commercially viable option because of cost. The nonwoven approach also provides a technical drop-in solution, as the final product is cut-to-need, from thick (high-loft) roll goods or sheets. This product form is very much like the current foam solution, which is supplied in bun stock. A further advantage of the high-loft nonwoven approach is the ability to use multiple materials within the same products. For example, it may be advantageous to blend fibers that have excellent fuel resistance, with fibers that have excellent heat capacity. Combinations of different fiber types can also be easily substituted within the same high loft nonwoven structure. For example, a 200-denier fiber, with a 2.0-inch fiber length, and having 17 crimps per inch fiber, was blended with 20% of a low melt 4-denier PET-G fiber that had a fiber length of 2.0 inches, and 17 crimps per inch. This product was produced and tested against a common explosion resistant, reticulated foam. The comparative results are depicted below in Table 1.

TABLE 1

| Product | Density (#/ft$^3$) | % Fuel Displacement | % Fuel Retention | Explosion resistance (PSI drop at 30% void) |
|---|---|---|---|---|
| Reticulated Foam | 1.35 | 3.2 | 6.6 | 9.1 |
| Nonwoven (80/20 PET/PETG) | 1.5 | 1.7 | 0.9 | 8.5 |

Testing of this basic construction validated that a textile, or fiber based, inerting foam can be produced at a similar density level and meet the fundamental technical performance requirements of military specification MIL-PRF-87062B. Not only was the explosion resistance better (8.5 psi drop, vs. a higher psi drop of 9.1), but fuel displacement and fuel retention levels were significantly reduced. Weight conservation is a premium in military applications.

In the previous example a 200 denier PET was selected as the primary structural fiber. As a practical matter, 200-denier is a common and commercially available fiber. Heavier denier fibers 500 to 1000 would also work in this application. However, the heavier the fiber denier selection of the structural fiber, the larger the voids (cells) that are created in the final structure. Although few, but heavier fibers would be beneficial for making lower density fiber-based foams, their associated larger void area would be detrimental to explosion resistance properties. These structures can be optimized by using blends of fiber. Heavier fibers (50 to 1000 denier) for structural support, and finer fibers (1 to 50 denier) for optimizing the cell size for explosion resistance performance.

Fiber length was selected at 2.0 inches, which was a compromise between processability and product needs. Fibers shorter than 0.5 inches are less likely to connect to neighboring fibers within the foam structure. Short, errant fibers in the final product could clog fuel lines in the final application. Longer fibers to 6 inches would be suitable within the final product but would be more problematic to process.

It should be noted, that while smaller cell sizes improve explosion resistance, they come at the detriment of fuel displacement and retention levels. The intrinsic value of the high-loft nonwoven process is the ability to engineer the final product structure to optimize its key performance properties (retention, vs displacement, vs. density, vs. explosion resistance, etc.).

Other performance and product features can be added via the addition of other fibers. For example, anti-static fibers can be added to the blend, in order to meet the ESD requirements of the MIL-PRF specification. The 4-denier low melt polyethylene terephthalate glycol (PETG) fiber was added to the product in the above example, to serve as the bonding agent needed to connect the individual heavier fibers in the bundle together. Heavier denier (5 to 1000)

PETG fiber would have been a preferred option in the example product, as "like fibers" mix better together in the process.

To avoid the potential detriment of fiber miscibility, bicomponent fibers would be used where the core serves at the structural support (200-denier in the product example), while the sheath could contain: low melt, anti-static, color, flame retardance (FR), and other properties.

Fitzer (U.S. Pat. No. 4,227,350) describes an underwater extrusion process for making a 2D nonwoven product. Fitzer's process was limited to 2D and requires two subsequent processes for adding bonding chemistry, as well as abrasive chemistry, Fitzer's process was also limited to a singular filament, or denier, size.

Figure 5:
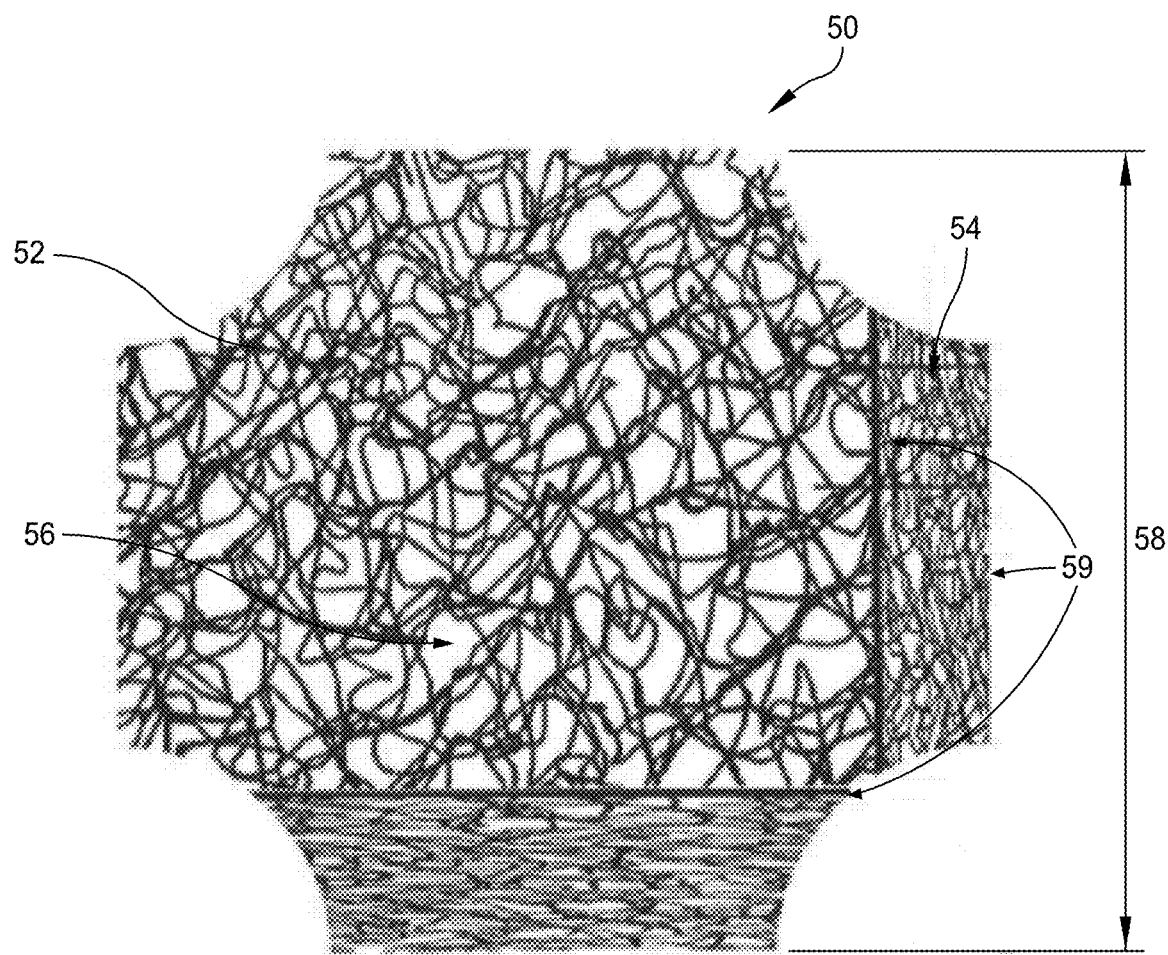
FIG. 5 is a perspective view of a variable denier wet formed shaped foam.

Referring to FIG. 5, all the advantages described above in relation to forming the block of FIG. 4 can be further leveraged toward directly building inerting foam parts.

As shown, a variable denier wet formed shaped foam is generally indicated at 50. The foam has an outer contour that is configured to match a contour of an internal surface of a fuel tank. This foam 50 is produced by extruding variable denier size filaments 52, 54 into a cooling bath. The filament sizes are regulated by a spinnerette with variable size extrusion holes. To a lesser extent, the variable filament sizes are also controlled via a gear pump and the distance between the spinnerette and the cooling bath. A void (or cell) size 56 is controlled by the distance between the holes drilled into the spinnerette or die. To a lesser extent, the cell size is controlled by the rate of controlled X, Y, and Z movement relative to the spinnerette. An overall thickness 58 of the foam is controlled by a rate of drop (in the vertical Z direction) of a building platform into the cooling bath, relative to the spinnerette. The final shape of the foam (as shown by edge 59) is adjusted by changing building platform in the X and Y directions relative to the spinnerette.

The nonwoven structure of FIG. 5 results in voids that are not regular, as in the case of the hollow spheres of FIG. 2. The porosity of the nonwoven structure of FIG. 4 may be approximated based on a pressure drop test, such as a test of a pressure drop between a first end of the nonwoven structure and a second end of the nonwoven structure. In some embodiments, the porosity of the foam 50 of FIG. 4 may be between 5 pores per inch and 50 pores per inch. A porosity of fewer than 5 pores per inch is unlikely to suppress ignition, or prevent sloshing, but would be lower in density. Fuel displacement and retention would be low. Porosity greater than 50 pores per inch would prevent ignitions and sloshing but would be higher in density. Fuel retention and displacement would be objectionably high.

Additively manufactured fiber-based foam parts can be directly produced via a modified filament extrusion process, where fiber fineness, color, cell size, anti-static, flame retardant, and other performance properties can be directly assembled into a final inerting foam part.

Figure 6:
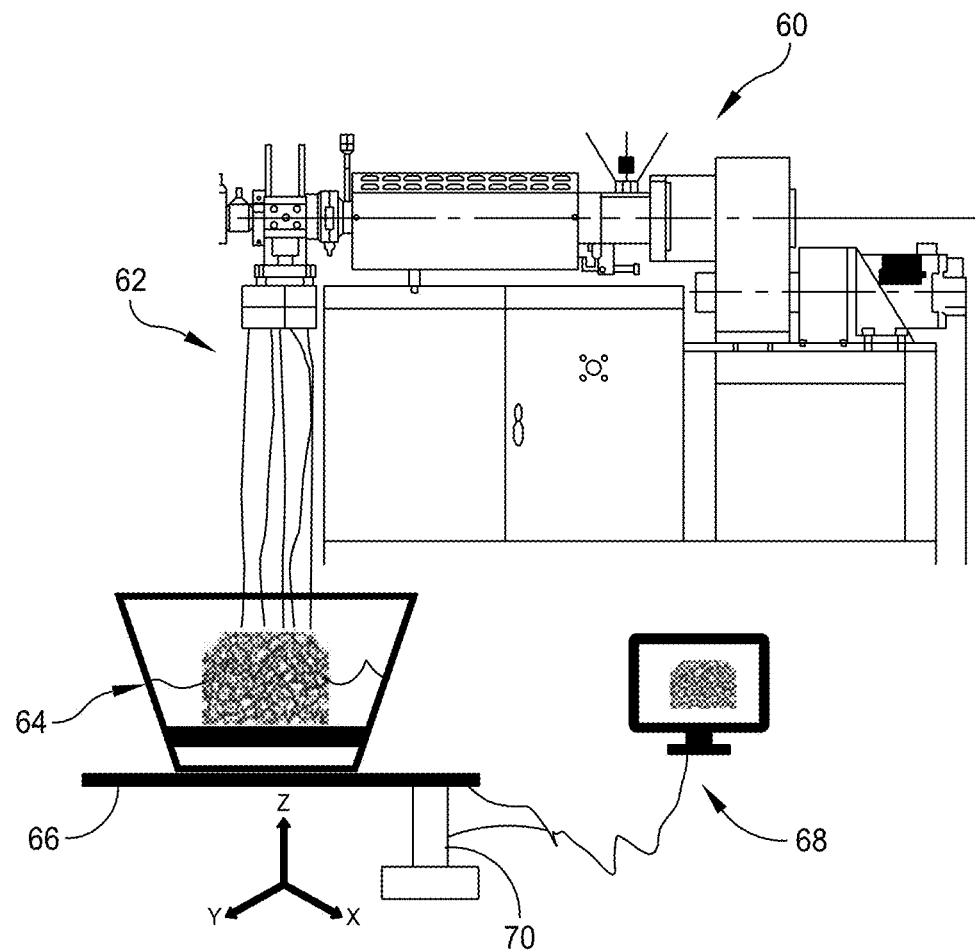
FIG. 6 is an apparatus for forming a foam.

Referring to FIG. 6, an embodiment of an apparatus for forming a foam structure is generally indicated at 60. In one embodiment, the apparatus 60 includes an extruder 62, a cooling bath 64 positioned on a platform 66, and a controller 68 in communication with the platform. The extruder 62 includes a variable speed pump and variable sized spinnerette. The extruder 62 is configured to receive material feedstock, usually in the form of pre compounded pellets for a single screw extruder. In the case of a twin screw extruder, raw materials would be mixed or compounded within the extrusion process itself, in the form of polymetric powders. In one embodiment, the feedstock may be a polymer type that is engineered to produce fibers and filaments. For example, polyester or nylon, or any other thermoplastic fiber. This feedstock would be placed into the feed hopper of the extruder 62. The performance needs of the fiber being produced would be engineered into the masterbatch, by a compounder (in the case of single screw extruder). Performance needs may include color, antistatic, antifouling, FR, etc. Melted pellets from the masterbatch are extruded through a spinnerette of the extruder 62, which has holes of predetermined sizes and spacings. Filaments emerging from the spinnerette are controlled via the gear pump and can be allowed to flow into the cooling bath 64 for cooling and solidification.

The cooling bath 64 is positioned below the extruder 62 to receive extruded material from the extruder 62. In some embodiments, the cooling bath 64 is a water bath.

Filaments of extruded material are bonded to extruded filaments that form underlying layers of the part build in the cooling bath 64. The process may be optimized based on a determined ideal dwell time of the filaments in the cooling bath. The extruded material needs to be hot enough to bond to adjacent fibers in the cooling bath.

As material is received in the cooling bath 64, the material forms a part via a layered additive process. The platform 66 imparts X, Y, and Z directional movement. By incrementally lowering the platform in the Z direction, layers of the part can be formed in the X-Y plane in the cooling bath 64.

The controller 68 allows for CNC control of the position of the platform 66. For example, the X, Y and Z directions of the cooling bath may be controlled by suitable servos or a robotic arm 70. The servos or robotic arm receives its coordinates via the controller 68.

The controller 68 may also be connected to the extruder 62 to control parameters of the extrusion process, such as a rate of extrusion.

In the present disclosure, explosion suppressing materials may exhibit high electrical resistivity. In some embodiments, explosion suppressing materials may exhibit high electrical resistivity levels between $1.0 \times 10^7$ ohm-cm to $5.0 \times 10^{11}$ ohm-cm.

In the present disclosure, explosion suppressing materials may have a high heat capacity. In some embodiments, explosion suppressing materials may have a heat capacity of at least 0.41 Calories/gram ° C.

In the present disclosure, explosion suppressing materials may be various materials, such as thermoplastic materials. In some embodiments, the thermoplastic material may be polyester, nylon, or another thermoplastic material. In some embodiments, the thermoplastic material is selected from polyester and nylon. In some embodiments, the thermoplastic material may be supplemented with organic, and/or inorganic fibrous materials. In some embodiments, the thermoplastic material may be supplemented with other organic and inorganic materials as provided in the masterbatch. In some embodiments, explosion suppressing materials used in any of the embodiments of the present disclosure are compliant with USAF's MIL-F-87260, which defines explosion suppression performance levels in their 3.7.1 test reference.

It should be understood, of course, that the foregoing relates to exemplary embodiments of the invention and that modifications may be made without departing from the spirit and scope of the invention as set forth in the following claims.

It should be understood, of course, that the foregoing relates to exemplary embodiments of the disclosure and that modifications may be made without departing from the spirit and scope of the present disclosure. Those skilled in the art should appreciate that the parameters and configurations described herein are exemplary and that actual parameters and/or configurations will depend on the specific application in which the disclosed systems and techniques are used. Those skilled in the art should also recognize or be able to ascertain, using no more than routine experimentation, equivalents to the specific embodiments disclosed. For example, those skilled in the art may recognize that the system, and components thereof, according to the present disclosure may further comprise a network or systems or be a component of containment bladder manufacturing system. It is therefore to be understood that the embodiments described herein are presented by way of example only and that, within the scope of the appended claims and equivalents thereto; the disclosed embodiments may be practiced otherwise than as specifically described. The present systems and methods are directed to each individual feature, system, or method described herein. In addition, any combination of two or more such features, systems, or methods, if such features, systems, or methods are not mutually inconsistent, is included within the scope of the present disclosure. The steps of the methods disclosed herein may be performed in the order illustrated or in alternate orders and the methods may include additional or alternative acts or may be performed with one or more of the illustrated acts omitted.

Further, it is to be appreciated that various alterations, modifications, and improvements will readily occur to those skilled in the art. Such alterations, modifications, and improvements are intended to be part of this disclosure and are intended to be within the spirit and scope of the disclosure. Accordingly, the foregoing description and figures are by way of example only. Further the depictions in the figures do not limit the disclosures to the particularly illustrated representations.

The phraseology and terminology used herein is for the purpose of description and should not be regarded as limiting. As used herein, the term "plurality" refers to two or more items or components. The terms "comprising," "including," "carrying," "having," "containing," and "involving," whether in the written description or the claims and the like, are open-ended terms, i.e., to mean "including but not limited to." Thus, the use of such terms is meant to encompass the items listed thereafter, and equivalents thereof, as well as additional items. Only the transitional phrases "consisting of" and "consisting essentially of," are closed or semi-closed transitional phrases, respectively, with respect to the claims. Use of ordinal terms such as "first," "second," "third," and the like in the claims to modify a claim element does not by itself connote any priority, precedence, or order of one claim element over another or the temporal order in which acts of a method are performed, but are used merely as labels to distinguish one claim element having a certain name from another element having a same name (but for use of the ordinal term) to distinguish the claim elements.

While exemplary embodiments of the disclosure have been disclosed, many modifications, additions, and deletions may be made therein without departing from the spirit and scope of the disclosure and its equivalents, as set forth in the following claims.

What is claimed is:

1. A method of providing at least one explosion resisting insert for a fuel tank, the method comprising:
   forming the at least one explosion resisting insert by additive manufacturing, wherein the at least one explosion resisting insert comprises a hollow body having an outer wall with an inner surface and an outer surface, wherein forming the at least one explosion resisting insert by additive manufacturing includes forming a plurality of perforations in the outer wall, and wherein the plurality of perforations extend from the outer surface to the inner surface of the at least one explosion resisting insert; and
   placing the at least one explosion resisting insert in the fuel tank.

2. The method of claim 1, further comprising
   inputting a 3D model of the at least one explosion resisting insert to a controller;
   outputting instructions from the controller to one of a 3D printer; and
   3D printing the at least one explosion resisting insert.

3. The method of claim 1, further comprising forming the at least one explosion resisting insert from a thermoplastic material.

4. The method of claim 1, wherein the hollow body comprises a spherical hollow body.

* * * * *